United States Patent
Gold et al.

(10) Patent No.: US 7,380,143 B2
(45) Date of Patent: May 27, 2008

(54) BATTERY SYSTEM CONFIGURATIONS FOR DOCKING COMPONENTS

(75) Inventors: Philip Gold, Austin, TX (US); Vinh X. Bui, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 376 days.

(21) Appl. No.: 11/206,399

(22) Filed: Aug. 18, 2005

(65) Prior Publication Data
US 2007/0043959 A1 Feb. 22, 2007

(51) Int. Cl.
*G06F 1/16* (2006.01)
*G06F 13/00* (2006.01)

(52) U.S. Cl. ............ 713/300; 713/310; 713/320; 713/321; 713/322; 713/323; 713/324; 713/330; 713/340; 710/303; 361/686

(58) Field of Classification Search ............ 713/300, 713/310, 320–324, 330, 340; 710/303; 361/686
See application file for complete search history.

(56) References Cited

U.S. PATENT DOCUMENTS

| | | | |
|---|---|---|---|
| 5,724,224 A | | 3/1998 | Howell et al. |
| 6,005,769 A | * | 12/1999 | Cho .................. 361/686 |
| 6,040,681 A | * | 3/2000 | May .................. 320/113 |
| 6,937,468 B2 | * | 8/2005 | Lin et al. .............. 361/686 |
| 2004/0066620 A1 | | 4/2004 | Grunow et al. |
| 2005/0047104 A1 | | 3/2005 | Grunow et al. |
| 2005/0111181 A1 | | 5/2005 | Schlesener et al. |

OTHER PUBLICATIONS

"ThinkPad X3 UltraBase", ThinkPad ThinkCentre, http://www-131.ibm.com/webapp/wcs/stores/servlet/ProductDisplay?catalogId=-840&storeId=10000001&langId=-1&dualCurrl...; printed from Internet on Jun. 21, 2005; 3 pgs.
"HP Notebook PCs Options & Accessories", http://h30143.www3.hp.com/options.cfm?oid=64295&from=enter.cfm&param=oid&val=64295 ; printed from Internet on Jun. 21, 2005; 49 pgs.

* cited by examiner

*Primary Examiner*—Abdelmoniem Elamin
(74) *Attorney, Agent, or Firm*—O'Keefe, Egan, Peterman & Enders LLP (57) ABSTRACT

Systems and methods for providing an extended battery system for a docking component such as a media slice. The extended battery system may be a high capacity battery system provided to power components of the docking component and to provide a relatively longer battery life than a conventional non-high capacity battery system. The docking component may be configured to be capable of charging the extended battery system, and/or the extended battery system may be configured so that it is also capable of use with a portable information handling system (e.g., notebook computer) that is configured for docking with the docking component. The extended battery may be configured as a frontal extending battery system for use with a docking component and/or portable information handling system.

25 Claims, 5 Drawing Sheets

BATTERY SYSTEM CONFIGURATIONS FOR DOCKING COMPONENTS

FIELD OF THE INVENTION

This invention relates generally to docking components for portable information handling systems, and more particularly to battery system configurations for portable information handling system docking components.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often configured as portable devices. One popular type of portable information handling system is a notebook computer. Notebook computers operate from battery packs that are contained internally within the chassis of the notebook computer. These battery packs are typically replaceable, so that when discharged they may be removed and replaced with a freshly charged battery through a battery opening provided in the chassis of the notebook computer. Battery openings are typically defined in a side and/or bottom surface of the notebook computer for accepting the battery pack.

High capacity batteries are often provided for use with notebook computers. These high capacity batteries often occupy more space than standard capacity batteries. When the chassis of a notebook computer is too small to completely house a high capacity battery, the battery may be configured to extend outside the chassis. A workable extended high capacity battery solution for a notebook computer typically does not conflict with other features the notebook computer supports (e.g., heat exchanger, fan, hard drive, motherboard, daughter card) and provides an ergonomically pleasing extension of the notebook computer system chassis. Many conventional high capacity battery designs extend from the rear or bottom of a notebook computer chassis. However, a rear extending battery prevents rear docking to an Advanced Port Replicator (APR) and eliminates the rear wall space for input/output (I/O) connections to monitors, mouse, keyboard, local area network (LAN) and modem. A bottom extending battery design prevents bottom docking to an APR or media slice.

A media slice is a component that houses storage media devices (e.g., magnetic disk drives, optical drives, etc.) and that is designed to dock with a notebook computer so that the notebook computer may access the media devices when it is docked with the media slice. A notebook computer typically docks to a media slice using connectors provided on the bottom surface of the notebook computer that connect with corresponding connectors provided on a top surface of the media slice. A media slice may operate from a replaceable battery pack that is contained internally within the chassis of the media slice. The battery pack typically installs from the rear side of the media slice. A media slice may be provided with a chassis that accepts and charges battery packs that are also capable of use within the notebook computer.

SUMMARY OF THE INVENTION

Disclosed herein are systems and methods for providing an extended battery system (e.g., a battery pack including one or more batteries) for a docking component (e.g., media slice or any battery powered docking station configuration). The docking component may be configured to be capable of charging the extended battery system, and/or the extended battery system may be configured so that it is also capable of use with a portable information handling system (e.g., notebook computer) that is configured for docking with the docking component. The extended battery system may also be configured to power the portable information handling system when the portable information handling system is docked with the docking component.

In one embodiment of the disclosed systems and methods, an extended battery system may be a high capacity battery system (e.g., a high capacity battery pack containing one or more batteries) that is provided to power a docking component for a portable information handling system (e.g., notebook computer). Such a high capacity battery system may be employed in a docking component (e.g., media slice) to power components of the docking component and to provide a relatively longer battery life than a conventional non-high capacity battery system.

In another embodiment, the disclosed systems and methods may be advantageously implemented to provide a frontal extending battery system for use with a docking component and portable information handling system (e.g., notebook computer) where the rear wall surface and/or bottom surface of the docking component and/or portable information handling system must be dedicated to incorporate other non-battery features (e.g. to incorporate rear or bottom connectors for electrical connection to an APR, to a full docking station, or to any other dockable component/s, etc.). In this regard, a frontal extending battery system may be advantageously employed to provide a portable power source having a life that is longer than a conventional non-extending battery.

Because a frontal extending battery system extends from the front of the docking component/portable information handling system, the battery system adds the flexibility needed to configure the rear wall and bottom surfaces of the docking component and/or portable information handling system to interface with devices outside the docking component and/or portable information handling system. This may be particularly advantageous, for example, when employed with relatively smaller docking components and portable information handling systems (e.g., such as an "ultra-portable" docking component or notebook computer) where rear and/or side space for docking connection is further limited relative to larger systems (e.g., conventionally sized docking component and notebook computers). In one exemplary embodiment, such relatively smaller docking components and portable information handling systems may be docking components and portable information handling systems having a footprint of less than or equal to about 9 inches by less than or equal to about 11 inches, as compared to more conventional sized docking components and portable information handling systems having a footprint of greater than about 9 inches by greater than about 11 inches (e.g., about 10 inches by about 12 inches), it being understood that the foregoing dimensions are exemplary only and that the disclosed systems and methods may be employed with either relatively small or with more conventionally sized docking components and portable information handling systems. Although it is not necessary that an extended battery for a docking component be frontal extending, such a frontal extending configuration may be employed to reduce docking component height as compared to embodiments where an extended battery extends from the bottom surface of a docking component.

In one exemplary configuration, the proximal (extending) end of a frontal extending battery system for a docking component or portable information handling system may be configured with a shape that is contoured so that the top of the battery system functions as an extension of a palm rest for the portable information handling system. Such a feature may be particularly desirable in combination with an "ultra-portable" notebook computer or other portable information handling system having a palm rest area that is relatively small and unable to support a full human palm during typing operations.

In yet another embodiment, a cavity for receiving an extended battery pack within a docking component (e.g., media slice) may be configured to be identical to the battery cavity found within a portable information handling system (e.g., notebook computer). In such an embodiment, the same technique for installing and removing the extended battery pack from the docking component may be employed to install and remove the extended battery from the portable information handling system. Furthermore, the docking component may be provided with battery charging circuitry configured to charge an extended battery pack while a portable information handling system is operating off another extended battery pack of the same configuration, and/or without the need for a unique battery bay when the portable information handling system is used apart from the docking component. For example, the battery charging circuitry may be configured to be coupled to an alternating current (AC) battery source and to convert a supplied alternating current to a suitable direct current (DC) for charging the extended battery pack.

In yet another embodiment, a docking component may also be provided with power distribution circuitry configured to power a portable information handling system from an extended battery pack while the portable information handling system is docked with the docking component. The docking component may be so configured to power the portable information handling system from an extended battery pack and/or from a power supply that is configured to be coupled to an AC power source and to convert AC current to suitable operating current for the portable information handling system. Since both portable information handling system and docking component may each hold an extended battery packs in such an embodiment, a portable information handling system with extended battery pack may be operated while assembled to the docking component with its own extended battery pack to simultaneously utilize the two extended battery packs (i.e., the extended battery packs of the portable information handling system and the docking component) to power the portable information handling system and double the extended battery life of the portable information handling system.

Thus, the disclosed systems and methods may be implemented in one exemplary embodiment to provide an extended battery system that extends from a front side of a docking component such as a media slice for a portable information handling system, such as a notebook computer. Because the battery system extends from a front side of the docking component, space remains available on the rear side of the docking component for connection to other devices. For example, a media slice for a notebook computer that is configured with a frontal extending battery system may be configured with rear side connector/s to allow connection to a docking component that provides connection to input/output (I/O) peripherals, e.g., keyboard, mouse, display, etc. In such a embodiment, a notebook computer may be docked to the media slice via connections made between connectors on the base of the notebook computer to connectors on the top side of the media slice at the same time the media slice is connected via rear-side connectors to a docking component that serves to connect the media slice and notebook computer to peripheral devices, even when the frontal extending battery is installed in the media slice.

In one respect, disclosed herein is a portable information handling system docking component, including: a docking component housing having a battery cavity defined therein; and a battery pack removably received within the battery cavity, the battery pack extending beyond an outer periphery of the docking component housing. The docking component may be configured for docking with a portable information handling system, and the battery pack may be configured to be removably received within a battery cavity defined within a base of the portable information handling system.

In another respect, disclosed herein is an information handling system docking component, including: a docking component housing; and an extended battery system coupled to the docking component housing. The docking component may be configured for docking with an information handling system.

In another respect, disclosed herein is a method of providing an information handling system docking component, including: providing a docking component housing; and providing an extended battery system coupled to the docking component housing. The docking component may be configured for docking with an information handling system.

DESCRIPTION OF ILLUSTRATIVE EMBODIMENTS

Figure 1:
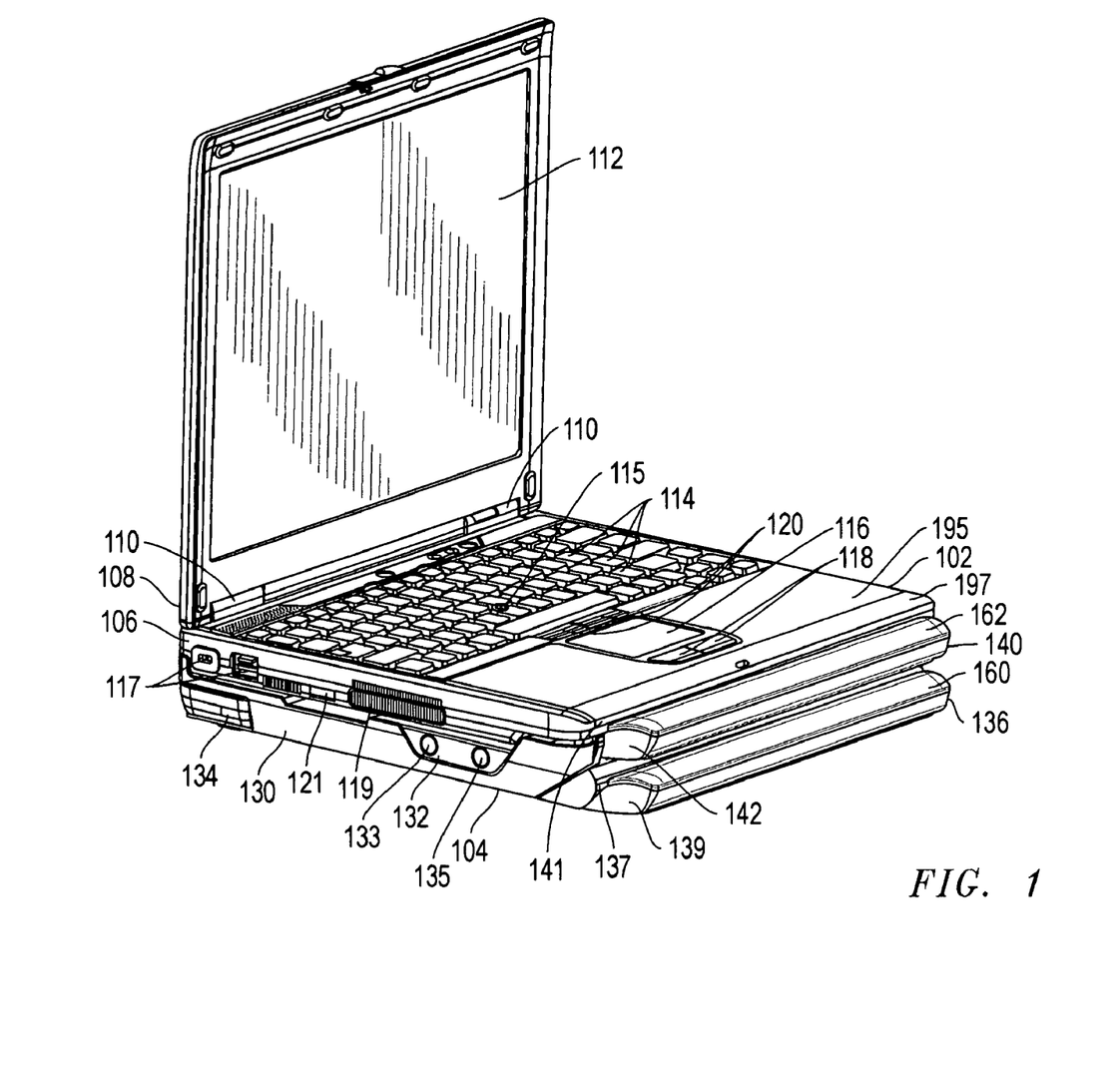
FIG. 1 is a perspective view of a portable information handling system and docking component according to one exemplary embodiment of the disclosed systems and methods.

FIG. 1 illustrates one exemplary embodiment of a portable information handling system 102 in the form of a notebook computer as it may be temporarily or removably docked with an information handling system docking component 104 in the form of a media slice. In this embodiment, portable information handling system 102 includes a notebook computer base 106 that is hingeably coupled to a lid 108 by hinge members 110. As shown, lid 108 includes display 112 (e.g., LCD display or other suitable display device), and notebook computer base 106 includes touchpad 116, touchpad buttons 118, stick pointer 115, stick pointer buttons 120 and a keyboard 114 (e.g., English QWERTY text keypad or other suitable keyboard type). As shown, various connectors or connection features 117 (e.g., security lock, USB connector) may be optionally provided on a side surface of information handling system 102. Also shown provided are optional infrared communication device 121 and optional cooling fan exhaust 119. It will be understood that the particular configuration of portable information handling system 102 illustrated in FIG. 1 is exemplary only and that other configurations of a portable information handling system are possible (with fewer, additional and/or alternative features), including other notebook computer configurations.

As further shown in FIG. 1, information handling system docking component 104 includes a docking component housing 130 in the form of a media slice housing that houses one or more media devices (not shown) such as magnetic disk drives, optical drives, etc. In this exemplary embodiment, docking component 104 includes a panel 132 for power button 133 and electronic undocking release button 135 that is provided for terminating at least part of the electrical interaction between electronic components of docking component 104 and portable information handling system 102 (e.g., using system bios) prior to mechanical undocking of system 102 from docking component 104. Also shown is mechanical undocking feature in the form of lever 134 that is provided for mechanically manipulating mechanical locking features 174 in order to disengage them from portable information handling system 102 so that system 102 may be undocked from docking component 104. Other features include electromagnetic interference (EMI) suppression features 173. It will be understood that the particular configuration of docking component 104 illustrated in FIG. 1 is exemplary only and that other configurations of a docking component are possible (e.g., with fewer, additional and/or alternative features), including other media slice configurations.

Still referring to FIG. 1, docking component 104 is shown provided with an extended battery system 136, i.e., at least a portion of battery system 136 extends beyond an outer periphery of docking component housing 130. In this exemplary embodiment, extended battery system 136 is configured in the form of a battery pack having a proximal end 139 that extends beyond the outer periphery of front surface 137 of docking component 104 when a distal end 143 (shown in FIG. 3) of battery system 136 is removably received in a corresponding frontal battery cavity provided in docking component 104. However, it will be understood that in other embodiments an extended battery system does not have to be configured as a removable battery pack, but may instead be a fixed or permanent component of docking component housing 130.

In the illustrated embodiment, the extending or proximal end 139 of battery system 136 has a cross sectional area that is greater than the cross sectional area of distal end 143 of battery system 136 received in battery cavity 150, although it is possible that the extending or proximal end 139 of battery system 136 may have a cross sectional area that is equal to, or less than, the cross sectional area of distal end 143 of battery system 136 received in battery cavity 150. Extended battery system 136 includes internal battery cells, one or more of which may be present within the proximal extending end 139 of extended battery system 136 so that greater battery cell space (or greater charge capacity) may be provided within extended battery system 136 than is provided within a non-extended battery system (i.e., a battery system that does not extend beyond the outer periphery of any surfaces of docking component housing 130 when inserted into the frontal battery cavity of docking component 104). For example, in one exemplary embodiment three battery cells may be included in proximal extending end 139 of battery system 136 in addition to six other battery cells provided in the portion of battery system 136 that is received in battery cavity 150. Thus, in this exemplary embodiment, nine battery cells may be provided in extended battery system 136 as compared to six battery cells that are provided within a non-extended battery system that is configured to be received in battery cavity 150, however it will be understood that greater or lesser numbers of battery cells may be provided in other embodiments. It will also be understood that the disclosed embodiment of FIG. 1 is exemplary only, and that an extended battery system may extend in other embodiments beyond the outer periphery of one or more other surfaces (e.g., back surface, right and/or left side surface, bottom surface, top surface, etc.) of a docking component.

It is possible that docking component 104 may be provided in one embodiment with a frontal battery cavity that is capable of removably accepting both extended and non-extended battery packs, although this is not necessary. When received within the frontal battery cavity provided in docking component 104, connectors on one or more outer surfaces of extended battery system 136 may be configured to make connection with corresponding connectors provided within one or more inner surfaces of the frontal battery cavity of docking component 104 for purposes of supplying power to electronic components of docking component 104. Docking component 104 may also be optionally configured to charge extended battery system 136 when docking component 104 is operating on alternating current (AC) power. Whether frontal extending or not, an extended battery may be configured for insertion into a corresponding battery cavity of a docking component in any suitable manner. For example, referring to the exemplary embodiment of FIG. 1, extended battery system 136 may be configured to be installed into battery cavity 150 from the bottom side of docking component 104 (e.g., using upward cantilevered motion), or so that the distal end 143 is directly inserted from the front of battery cavity 150 and slid rearward into battery cavity 150 in a direction toward the rear of docking component 104.

In the embodiment of FIG. 1, portable information handling system 102 is provided with an extended battery system 140 configured in the form of a removable battery pack having a proximal end 142 that extends past the periphery of front surface 141 of portable information handling system 102 when a distal end 145 (shown in FIG. 4) of battery system 140 is received in a corresponding frontal battery cavity provided in portable information handling system 102. In one exemplary embodiment, portable information handling system 102 may be optionally provided with a frontal battery cavity configured to removably receive the same configuration of extended battery pack as is accepted by the frontal battery cavity of docking component 104. In this way, extended battery packs of the same design may be interchanged between docking component 104 and portable information handling system 102, e.g., for charging purposes. However, it will be understood that it is not necessary that portable information handling system 102 be configured with the capability of accepting such a frontal extending battery pack, or of accepting an extended battery pack at all.

It will be understood that FIG. 1 is exemplary only and that it is possible that a docking component itself may be configured for docking with another (second) docking component, e.g., so that multiple docking components may be docked together in a stacked relationship. Where multiple docking components are so employed, each docking component may be configured to receive the same extended battery configuration, e.g. so that a given extended battery is interchangeable between two or more stackable docking components as well as a portable information handling system that is configured for docking with at least one of the docking components. Further information on docking components such as media slices that are configured for docking with portable information handling systems such as notebook computers may be found in U.S. patent application Ser. No. 10/266,243 (United States Patent Application Publication No. 2004/0066620), now abandoned, U.S. patent application Ser. No. 10/720,713 (United States Patent Application Publication No. 2005/0111181), now U.S. Pat. No. 7,085,132, and U.S. patent application Ser. No. 10/652,359 (United States Patent Application Publication No. 2005/0047104), now, U.S. Pat. No. 7,256,990, each of which is incorporated herein by reference.

Figure 2:
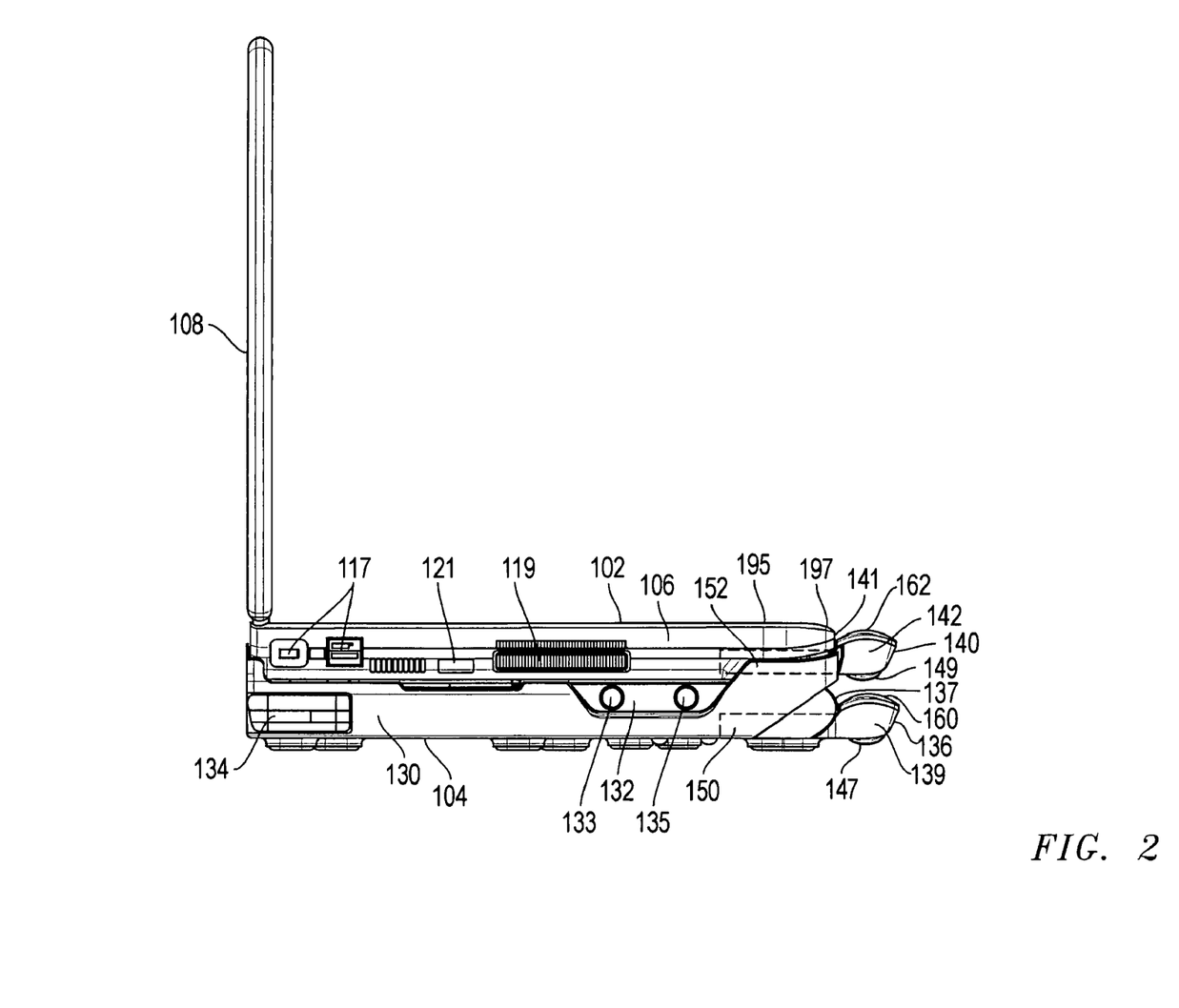
FIG. 2 is a right side view of portable information handling system and docking component according to one exemplary embodiment of the disclosed systems and methods.

FIG. 2 shows a right side view of portable information handling system 102 temporarily or removably docked with docking component 104 of FIG. 1. FIG. 2 shows extended battery system 136 in dashed outline as it may be received in internal battery cavity 150 (shown in dashed outline) of docking component 104, and shows extended battery system 140 received in internal battery cavity 152 (shown in dashed outline) of portable information handling system 102. Whether configured to be frontal extending or not, an extended battery may be configured for insertion into a corresponding battery cavity of a docking component and/or portable information handling system in any suitable manner. For example, referring to the exemplary embodiment of FIG. 1, extended battery system 136 may be configured to be installed into battery cavity 150 from the bottom side of docking component 104 (e.g., using upward cantilevered motion) or to slide rearward into battery cavity 150 from the front of docking component 104. In either case, battery cavity 150 may be configured to be open at the bottom, e.g., so that the bottom surface of extended battery pack 136 is exposed when received within battery cavity 150. In such an embodiment, external support members 147 (e.g., rubberized feet) may be provided to help support docking component and/or extended battery system 136 on a surface (e.g. desktop surface) when battery system 136 is received within battery cavity 150 of docking component 104. A similar extended battery and battery cavity configuration may be provided for portable information handling system 102, along with external support members 149.

In the embodiment illustrated, proximal end 139 of extended battery system 136 is shown as it may be optionally provided with a substantially arcuate upper surface 160, and proximal end 142 of extended battery system 140 is shown as it may be optionally provided with a substantially arcuate upper surface 162. Provision of such substantially arcuate shaped surfaces on frontally-extending battery packs 136 and 140 may be desirable, for example, to provide a comfortable and ergonomic surface upon which a user's palm may rest while using touchpad and/or keyboard features of portable information handling system 102 when a given battery pack is received in the battery cavity 152 of portable information handling system 102 such that arcuate upper surface 160 or 162 is positioned adjacent upper user input surface (e.g., keyboard and/or touchpad surface) 195 of base 106 of portable information handling system 104.

In one exemplary embodiment, proximal end 142 of extended battery system 140 may be configured so that substantially arcuate upper surface 162 is disposed in substantially coplanar relationship with adjacent upper surface 195 when battery system 140 is received in battery cavity 152. In another exemplary embodiment, proximal end 142 of extended battery system 140 may be configured so that substantially arcuate upper surface 162 is disposed in stepped-down relationship with adjacent upper surface 195 when battery system 140 is received in battery cavity 152, as shown in FIG. 2. FIG. 2 also illustrates that upper surface 195 may be optionally configured in one exemplary embodiment with a segment 197 that tapers downwardly toward substantially arcuate upper surface 162 with a gap formed between surface 162 and segment 197 of surface 195. However, it will be understood that these are exemplary embodiments only, and proximal end 142 of extended battery system 140 may be configured so that substantially arcuate upper surface 162 is disposed in any other type adjacent relationship with upper surface 195 when battery system 140 is received in battery cavity 152 (e.g., substantially arcuate upper surface 162 may be disposed in stepped-up relationship with adjacent upper surface 195, and/or in a relationship such that upper surface 195 and arcuate upper surface 162 form a substantially contiguous and/or horizontal surface with no gap present therebetween).

However, it will be understood that a proximal extending end of an extended battery pack may be configured with other shapes, e.g., a substantially flat upper surface. It will also be understood that a frontal extending battery may be configured for use with docking component 104 when a frontal extending battery for portable information handling system 102 is not present. In such an embodiment, the frontal extending battery may be configured with a larger proximal extending end (e.g., containing more battery cells, larger battery cells, etc.) than is shown in the Figures herein. Such a relatively larger proximal end may be configured, for example, to upwardly extend from battery cavity 150 to a point adjacent an upper surface of portable information handling system 102 (e.g., to a point at or near the location of surface 162 of the Figures) in order to provide an upper surface (e.g., substantially arcuate upper surface) upon which a user's palm may rest while using touchpad and/or keyboard features of portable information handling system 102 when the battery pack is received in the battery cavity 150 of docking component 104.

Figure 3:
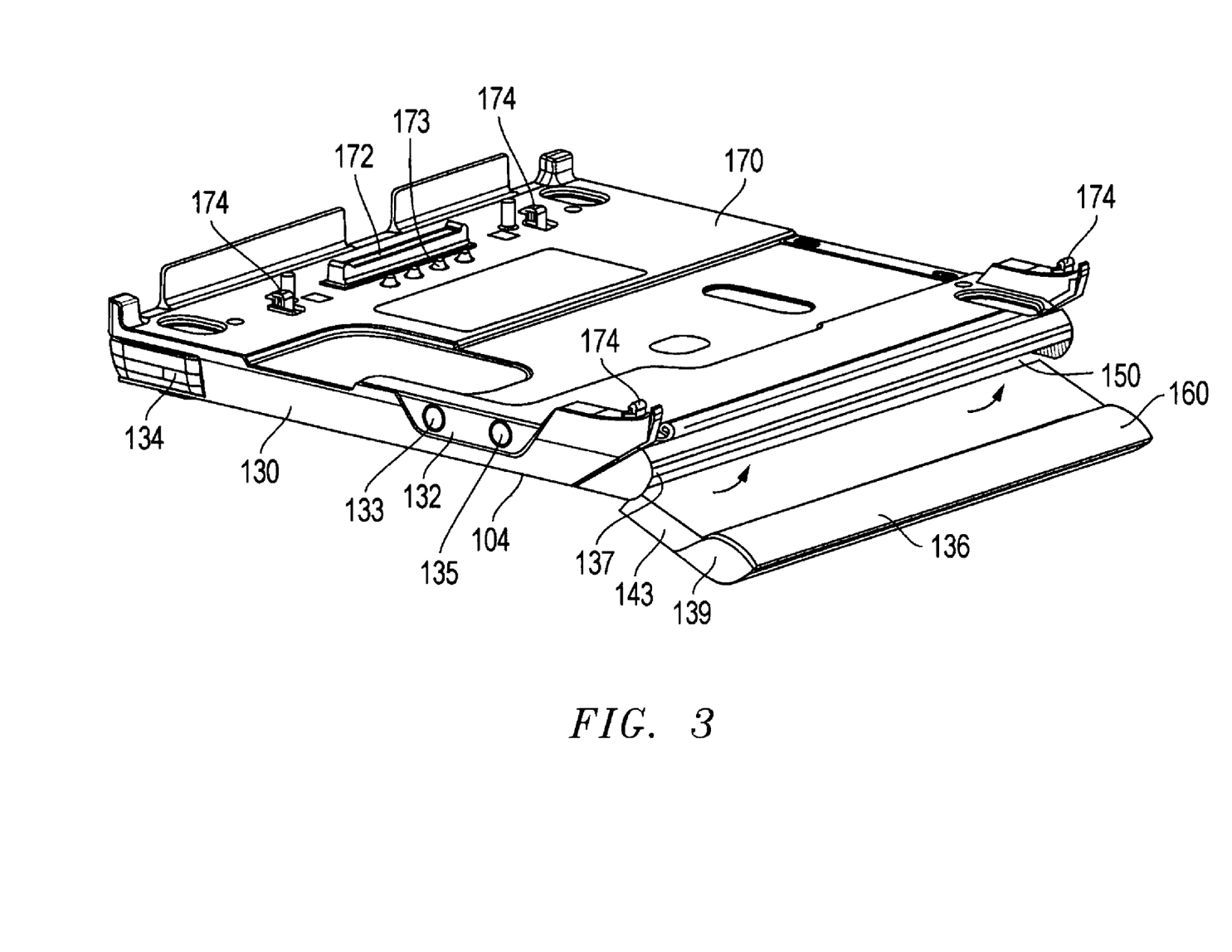
FIG. 3 is a perspective view of an extended battery pack positioned for insertion into a docking component according to one exemplary embodiment of the disclosed systems and methods.

FIG. 3 shows an exploded perspective view of extended battery system 136 positioned for insertion into frontally opening battery cavity 150 of docking component 104. An exemplary cantilevered installation motion for inserting extended battery system 136 into battery cavity 150 is represented by arrows in FIG. 3. In this exemplary embodiment, distal end 145 of system 136 is first inserted into battery cavity 150 at an angle from below and driven rearward into cavity 150, proximal end 139 of system 136 is then raised until received within battery cavity 150 using upward cantilevered motion, and then system 136 is pushed further rearward into cavity 150 until mechanical and/or electrical connectors between battery system 136 and docking component 104 are mated. In an alternative embodiment, system 136 and docking component 104 may be configured so that the distal end 143 of system 136 is inserted into battery cavity 150 directly from the front of docking component 104 and slid rearward into battery cavity 150 in a direction toward the rear of docking component 104, i.e., without cantilevered motion. However, it will be understood that an extended battery system may be configured to be removably received into a docking component and/or portable information handling system in any other suitable manner.

As shown in FIG. 3, docking component 104 is configured with an upper side surface 170 having electrical connection features 172 and mechanical locking features in the form of hooks 174 that are employed to engage complementary features of portable information handling system 102 so as to mechanically dock portable information handling system from above with docking component 104. In this regard, extended battery system 136 may be configured in one embodiment such that battery system 136 (including proximal end 139) does not interfere with overhead docking and undocking operations of portable information handling system 102 from docking component 104 when extended battery system 136 is received in battery cavity 150. Furthermore, using the exemplary cantilevered battery insertion motion shown in FIG. 3, or using an alternative direct insertion of battery system 136 from the front of battery cavity 150 toward the rear of docking component 104, allows battery system 136 to be removed and/or inserted into docking component 104 while portable information handling system 102 is docked (with or without extended battery 140) with docking component 104. Furthermore, where battery system 136 is configured for direct frontal insertion (i.e., without upward cantilevered motion) into battery cavity 150, battery system 136 may be removed and/or inserted while docking component 104 is itself docked to another docking component (e.g., APR) below. Similar flexibility may be provided for removal and/or insertion of battery system 140 into portable information handling system 102 during docked state when battery system 140 is configured for direct frontal insertion into battery cavity 152.

Figure 4:
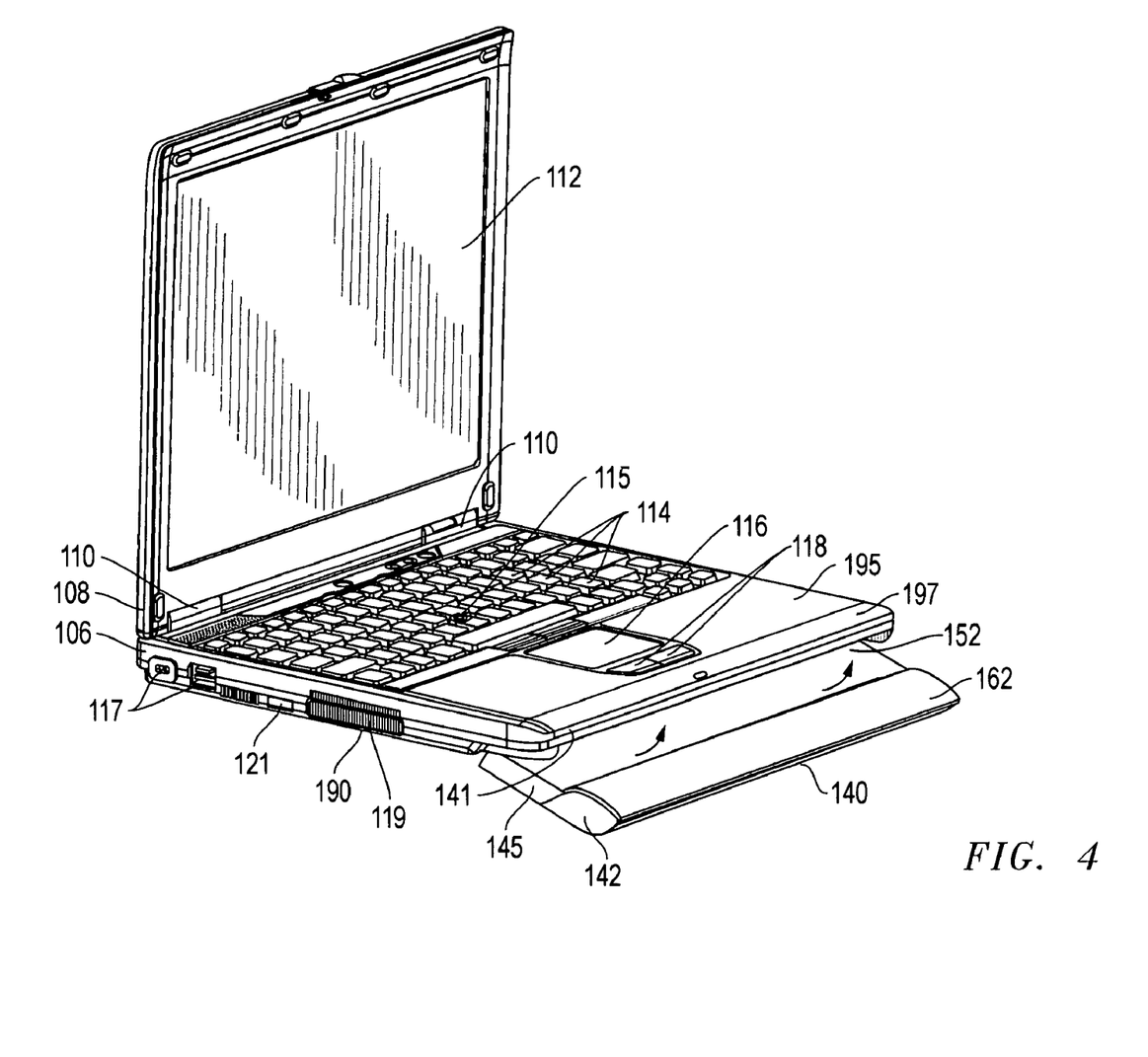
FIG. 4 is a perspective view of an extended battery pack positioned for insertion into a portable information handling system according to one exemplary embodiment of the disclosed systems and methods.

FIG. 4 shows an exploded perspective view of extended battery pack 142 positioned for insertion into frontally opening battery cavity 152 of portable information handling system 102. An exemplary cantilevered installation motion for inserting extended battery system 140 into battery cavity 152 is represented by arrows in FIG. 4. Portable information handling system 102 is configured with a lower side surface 190 having electrical connection features and mechanical locking features (not shown) that are configured complementary to electrical connection features 172 and mechanical locking features 174 of docking component 104 such that portable information handling system 102 may be docked from above with docking component 104. In this regard, extended battery pack 142 may be configured in one embodiment such that its proximal end 145 does not interfere with overhead docking and undocking operations of portable information handling system 102 from docking component 104.

Figure 5:
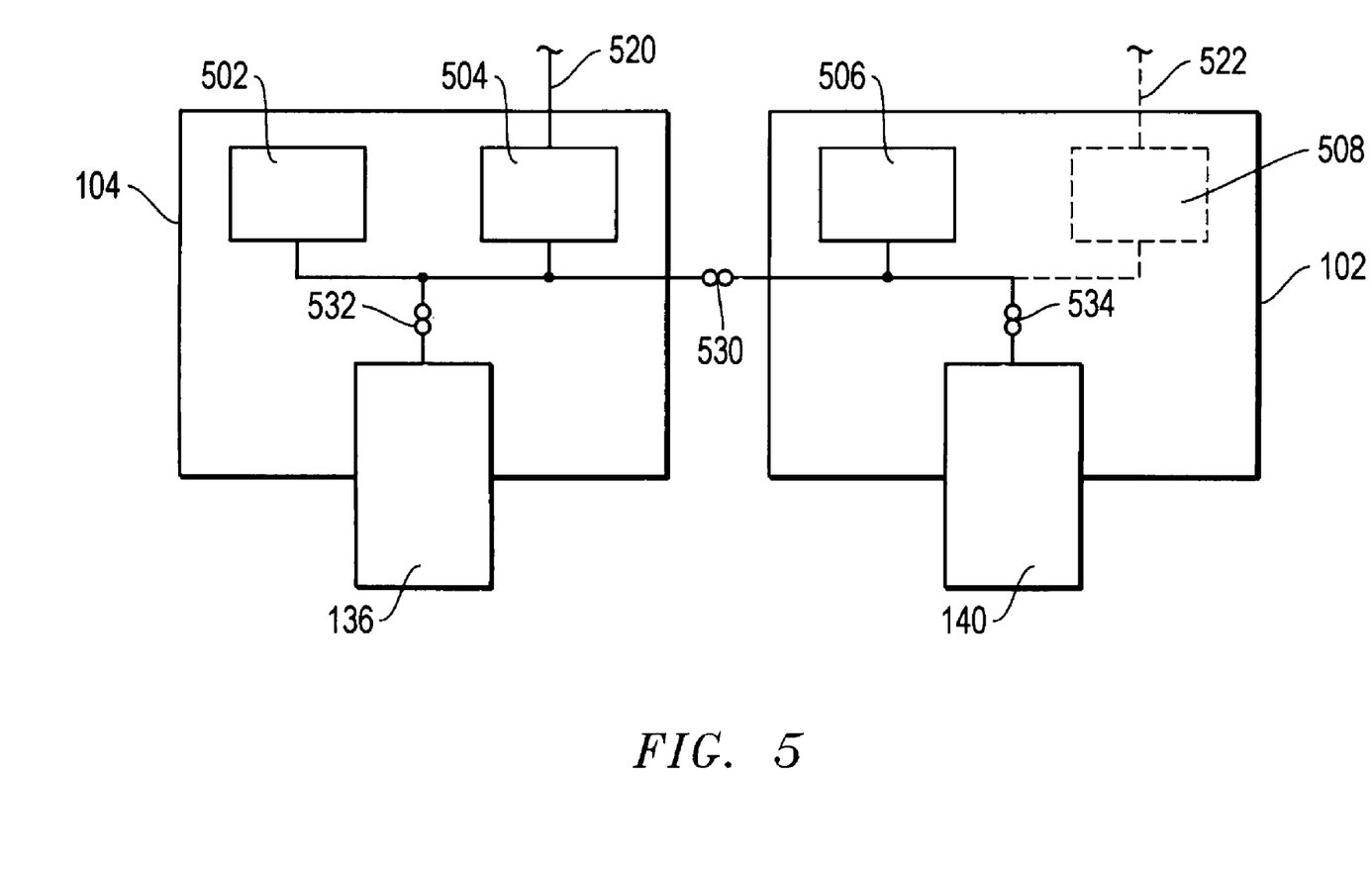
FIG. 5 is a simplified block diagram showing a portable information handling system and a docking component according to one exemplary embodiment of the disclosed systems and methods.

FIG. 5 is a simplified block diagram illustrating one exemplary embodiment of the disclosed systems and methods in which a portable information handling system 102 is docked with a docking component 104 via docking connector terminals 530. As shown, docking component 104 includes circuitry 502 (e.g., media device components such as magnetic disk drives, optical drives, etc.) that are coupled to be powered by extended battery pack 136. In this regard, extended battery pack 136 is temporarily coupled to provide power to circuitry 502 via battery pack connection terminals 532. In this exemplary embodiment, docking component 104 also includes battery charging apparatus 504 that may be coupled to AC power source 520 and configured to provide suitable direct current (DC) for charging extended battery pack 136 and optionally for powering circuitry 502. Battery charging apparatus 504 may be integrated within docking component 504 or may be, for example, an external power adapter in other embodiments.

As further shown in FIG. 5, portable information handling system 104 includes circuitry 506 (e.g., computer processor, computer display, wireless network card, etc.) that are coupled to be powered by extended battery pack 140, e.g., that may of identical configuration as extended battery pack 136. In this regard, extended battery pack 140 is shown temporarily coupled to provide power to circuitry 506 via battery pack connection terminals 534. Portable information handling system 102 may also optionally include integrated or external battery charging apparatus 508 that may be coupled to AC power source 522 and configured to provide suitable direct current (DC) for charging extended battery pack 140 and optionally for powering circuitry 506.

When docked to portable information handling system 102, docking component 104 may be temporarily coupled to portable information handling system 102 via terminals 530 so that extended battery pack 136 is capable of powering circuitry 506 of portable information handling system, e.g. simultaneously and in combination with extended battery pack 140 (e.g., to provide substantially double the battery life of extended battery pack 140 alone), or in the absence of extended battery pack 140. Not shown in FIG. 5 are various battery management circuitry features that may be present to regulate charging and discharging of extended battery packs 136 and 140, to regulate power/current distribution between docking component 104 and portable information handling system 102, to regulate power/current distribution between components within each of docking component 104 and portable information handling system 102, etc.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A portable information handling system docking component, comprising:
    a docking component housing having a first battery cavity defined therein; and
    a battery pack removably received within said first battery cavity, said battery pack extending beyond an outer periphery of said docking component housing;
    wherein said docking component is configured for docking with a portable information handling system;
    wherein said battery pack is also configured to be removably received within a second battery cavity defined within a base of said portable information handling system;
    wherein said portable information handling system has an upper user input surface comprising at least one of a keyboard, stick pointer or touchpad and defining a palm rest area, said palm rest area being disposed at said front surface of said information handling system and being configured to at least partially support a human palm during use of said upper user input surface;
    wherein said docking component is configured to dock with said portable information handling system such that a front surface of said docking component is positioned adjacent said front surface of said portable information handling system when said docking component is docked with said portable information handling system;
    wherein said first battery cavity of said docking component is defined in said front surface of said docking component such that said first battery cavity is aligned beneath at least a portion of said upper user input surface of said portable information handling system when said docking component is docked with said portable information handling system; and
    wherein said battery pack extends beyond a periphery of said front surface of said docking component housing when said battery pack is received in said first battery cavity of said docking component.

2. The portable information handling system docking component of claim 1, wherein said docking component housing is configured as a media slice housing having at least one magnetic disk drive, at least one optical drive, or a combination thereof; and wherein said portable information handling system comprises a notebook computer.

3. The portable information handling system docking component of claim 2, wherein said docking component comprises a first battery pack removably received within said battery cavity of said docking component housing; and wherein said docking component is configured to supply power from said first battery pack to said portable information handling system when said docking component is docked with said portable information handling system.

4. The portable information handling system docking component of claim 3, wherein said docking component is configured to supply power from said first battery pack to said portable information handling system when said docking component is docked with said portable information handling system so that said portable information handling system may operate simultaneously from said first battery pack and from a second battery pack removably received within said battery cavity defined within said base of said portable information handling system.

5. The portable information handling system docking component of claim 2, wherein said battery pack comprises a distal end removably received within said battery cavity of said docking component, and a proximal end extending beyond a periphery of a front surface of said docking component housing; and wherein said proximal end of said battery pack is configured to be disposed adjacent said upper user input surface of said base of said portable information handling system and is configured to provide an upper surface for a user's palm to rest while using said at least one of a keyboard, stick pointer or touchpad of said upper user input surface of said portable information handling system when said battery pack is removably received within said second battery cavity defined within said base of said portable information handling system.

6. An information handling system docking component, comprising:
    a docking component housing; and
    a frontally-extending battery system coupled to said docking component housing;
    wherein said docking component is configured for docking with an information handling system having an upper user input surface defining a palm rest area, said palm rest area being disposed at a front surface of said information handling system and being configured to at least partially support a human palm during use of said upper user input surface;
    wherein said docking component is configured to dock with said information handling system such that a front surface of said docking component housing is positioned adjacent said front surface of said information handling system when said docking component is docked with said information handling system;
    wherein said frontally-extending battery system is aligned beneath at least a portion of said upper user input surface of said information handling system when said docking component is docked with said information handling system; and
    wherein said frontally-extending battery system extends beyond a periphery of said front surface of said docking component housing.

7. The information handling system docking component of claim 6, wherein said frontally-extending battery system comprises a battery pack removably received in said docking component housing; and wherein said information handling system comprises a portable information handling system.

8. The information handling system docking component of claim 7, wherein said docking component housing is configured as a media slice housing having at least one magnetic disk drive, at least one optical drive, or a combination thereof.

9. The information handling system docking component of claim 7, wherein said docking component housing comprises a rear surface disposed on an opposite side of said docking component housing from said front surface of said docking component housing; and wherein said rear surface of said docking component housing is configured with at least one electrical connector for docking with another docking component.

10. The information handling system docking component of claim 7, wherein said frontally-extending battery system is removably received within a battery cavity defined within said docking component; and wherein said extended battery system is also configured to be removably received within a battery cavity defined within a base of said portable information handling system.

11. The information handling system docking component of claim 10, wherein said frontally-extending battery system comprises a distal end removably received within said battery cavity of said docking component, and a proximal end extending beyond a periphery of a front surface of said docking component housing; wherein said proximal end of said frontally-extending battery system is configured to be disposed adjacent said upper user input surface of said base of said portable information handling system when said frontally-extending battery system is removably received within said battery cavity defined within said base of said portable information handling system; and wherein said proximal end of said frontally-extending battery system is configured with a shape that functions as an extension of a palm rest for said portable information handling system when said frontally-extending battery system is removably received within said battery cavity defined within said base of said portable information handling system.

12. A method of providing an information handling system docking component, comprising:
providing a docking component housing; and
providing a frontally-extending battery system coupled to said docking component housing;
wherein said docking component is configured for docking with an information handling system having an upper user input surface defining a palm rest area, said palm rest area being disposed at a front surface of said information handling system and being configured to at least partially support a human palm during use of said upper user input surface;
wherein said docking component is configured to dock with said information handling system such that a front surface of said docking component housing is positioned adjacent said front surface of said information handling system when said docking component is docked with said information handling system;
wherein said frontally-extending battery system is aligned beneath at least a portion of said upper user input surface of said information handling system when said docking component is docked with said information handling system; and
wherein said frontally-extending battery system extends beyond a periphery of said front surface of said docking component housing.

13. The method of claim 12, wherein said frontally-extending battery system is provided as an extended battery pack removably received in said docking component housing; and wherein said information handling system comprises a portable information handling system.

14. The method of claim 13, wherein said docking component housing is configured as a media slice housing having at least one magnetic disk drive, at least one optical drive, or a combination thereof; and wherein said portable information handling system comprises a notebook computer.

15. The method of claim 13, wherein said frontally-extending battery system is removably received within a first battery cavity defined within said docking component; and wherein said extended battery system is configured to be removably received within a second battery cavity defined within a base of said portable information handling system.

16. The method of claim 15, wherein said frontally-extending battery system comprises a distal end removably received within said battery cavity of said docking component, and a proximal end extending beyond a periphery of a front surface of said docking component housing; wherein said proximal end of said frontally-extending battery system is configured to be disposed adjacent an upper user input surface of said base of said portable information handling system when said frontally-extending battery system is removably received within said second battery cavity defined within said base of said portable information handling system; and wherein said proximal end of said frontally-extending battery system is configured with a shape that functions as an extension of a palm rest for said portable information handling system when said frontally-extending battery system is removably received within said second battery cavity defined within said base of said portable information handling system.

17. The method of claim 13, wherein said docking component comprises a first battery pack removably received within a battery cavity of said docking component housing; and wherein said docking component is configured to supply power from said first battery pack to said portable information handling system when said docking component is docked with said portable information handling system.

18. The method of claim 17, wherein said docking component is configured to supply power from said first battery pack to said portable information handling system when said docking component is docked with said portable information handling system so that said portable information handling system may operate simultaneously from said first battery pack and from a second battery pack removably received within a battery cavity defined within a base of said portable information handling system.

19. The portable information handling system docking component of claim 2, wherein said docking component comprises a top surface configured with at least one electrical connector for docking with a base of said notebook computer; wherein said docking component comprises a rear surface disposed on an opposite side of said docking component from said front surface of said docking component; and wherein said rear surface of said docking component is configured with at least one electrical connector for docking with another docking component that provides electrical connection to one or more input/output peripherals at the same time said base of said notebook computer is docked with said at least one electrical connector on said top side of said docking component.

20. The portable information handling system docking component of claim 5, wherein said proximal end of said battery pack is configured with a shape that is contoured so that the top of the battery system functions as an extension of a palm rest for said portable information handling system when said battery pack is removably received within said second battery cavity defined within said base of said portable information handling system.

21. The portable information handling system docking component of claim 20, wherein said proximal end of said battery pack is configured with a substantially arcuate upper surface to provide an ergonomic surface for said user's palm to rest while using said at least one of said keyboard, stick pointer or touchpad of said upper user input surface of said portable information handling system when said battery pack is removably received within said second battery cavity defined within said base of said portable information handling system.

22. The portable information handling system docking component of claim 5, wherein said proximal end of said battery pack is configured with a cross sectional area that is greater than the cross sectional area of said distal end of said battery pack.

23. A portable information handling system and docking component combination, comprising:
- a docking component housing having a first battery cavity defined therein;
- a battery pack removably received within said first battery cavity, said battery pack extending beyond an outer periphery of said docking component housing;
- a portable information handling system having an upper user input surface comprising a keyboard and defining a palm rest area, said palm rest area being disposed at said front surface of said information handling system and being configured to at least partially support a human palm during use of said keyboard of said upper user input surface;
- wherein said docking component is configured for docking with said portable information handling system such that a front surface of said docking component is positioned adjacent said front surface of said portable information handling system when said docking component is docked with said portable information handling system;
- wherein said battery pack is also configured to be removably received within a second battery cavity defined within a base of said portable information handling system;
- wherein said first battery cavity of said docking component is defined in said front surface of said docking component such that said first battery cavity is aligned beneath at least a portion of said upper user input surface of said portable information handling system when said docking component is docked with said portable information handling system; and
- wherein said battery pack extends beyond a periphery of said front surface of said docking component housing when said battery pack is received in said first battery cavity of said docking component.

24. The portable information handling system and docking component combination of claim 23, wherein said docking component housing is configured as a media slice housing having at least one magnetic disk drive, at least one optical drive, or a combination thereof; and wherein said portable information handling system comprises a notebook computer.

25. The portable information handling system and docking component combination of claim 23, wherein said docking component is docked with said portable information handling system such that a front surface of said docking component is positioned adjacent said front surface of said portable information handling system, and such that said first battery cavity of said docking component is aligned beneath at least a portion of said upper user input surface of said portable information handling system.

* * * * *